US008341670B2

(12) United States Patent  (10) Patent No.: US 8,341,670 B2
Kim et al.  (45) Date of Patent: Dec. 25, 2012

(54) METHOD AND SYSTEM FOR PROVIDING APPLICATION SERVICE

(75) Inventors: Jin-Won Kim, Seoul (KR); Hwan-Hyo Park, Seoul (KR)

(73) Assignee: Alticast Corporation, Seoul (KR)

( * ) Notice: Subject to any disclaimer, the term of this patent is extended or adjusted under 35 U.S.C. 154(b) by 555 days.

(21) Appl. No.: 12/208,048

(22) Filed: Sep. 10, 2008

(65) Prior Publication Data

US 2009/0070814 A1  Mar. 12, 2009

(30) Foreign Application Priority Data

Sep. 10, 2007 (KR) .................. 10-2007-0091509

(51) Int. Cl.
H04N 7/10 (2006.01)
H04N 7/025 (2006.01)
H04N 5/445 (2006.01)
G06F 3/00 (2006.01)
G06F 13/00 (2006.01)

(52) U.S. Cl. ............... 725/40; 725/32; 725/36; 725/37; 725/39; 725/42; 725/43; 725/51

(58) Field of Classification Search ............. 725/81
See application file for complete search history.

(56) References Cited

U.S. PATENT DOCUMENTS

| | | | |
|---|---|---|---|
| 6,317,780 B1 * | 11/2001 | Cohn et al. .................. 709/217 |
| 2004/0030599 A1 * | 2/2004 | Sie et al. ..................... 705/14 |
| 2005/0125823 A1 * | 6/2005 | McCoy et al. ............... 725/34 |
| 2005/0166224 A1 * | 7/2005 | Ficco ........................... 725/35 |
| 2005/0210514 A1 * | 9/2005 | Kittlaus et al. .............. 725/81 |
| 2006/0107281 A1 * | 5/2006 | Dunton ........................ 725/11 |
| 2008/0263581 A1 * | 10/2008 | Turner ......................... 725/22 |

\* cited by examiner

Primary Examiner — Justin Shepard
(74) Attorney, Agent, or Firm — Edwards Wildman Palmer LLP (57) ABSTRACT

A method and a system for providing application service are disclosed. The method of providing application service in a digital data broadcasting system coupled to at least one broadcasting terminal through a network includes generating a preview contents by using first data combined with an application for data broadcasting service, wherein the preview contents has second data provided when a user requests the application service, and transmitting the generated preview contents to the broadcasting terminal. Here, the broadcasting terminal outputs the preview contents before data broadcasting standby time. Accordingly, useful information may be provided to the user before the application is executed.

10 Claims, 9 Drawing Sheets

METHOD AND SYSTEM FOR PROVIDING APPLICATION SERVICE

CROSS-REFERENCE TO RELATED APPLICATIONS

This application claims priority from Korean Patent Application No. 2007-91509 filed on Sep. 10, 2007, the contents of which are incorporated herein by reference in its entirety.

TECHNICAL FIELD

The present disclosure relates to a method and a system for providing useful information rapidly to a user in data broadcasting.

RELATED ART

Digital broadcasting service has been developed according as users require high definition broadcasting, an interactive broadcasting and various additional services.

A technique for standardization of the digital broadcasting has been developed with European digital video broadcasting-multimedia home platform (Hereinafter, referred to as "DVB-MHP") and American advanced television systems committee-digital TV application software environment (Hereinafter, referred to as "ATSCDASE").

With the development of the standardization of the digital broadcasting, a broadcasting signal having a video signal, an audio signal and a data signal can be compressed as a digital signal, which enables multi-channel application in TV broadcasting. In addition, transmission rating can be increased, which enables various programs to be provided in a certain channel.

Specially, data broadcasting service for providing a broadcasting and data (additional information) related to the broadcasting has been provided according as corresponding applications have been developed. The data (additional information) may include weather service, news service, stock service, email service, electric program guide EPG service, TV shopping service, banking service, call service and Internet search service.

In the data broadcasting service, a broadcasting system combines data (e.g., weather, news, texts collected from a stock server and graphic information) with an appropriate application or applications, and then provides the combined information to a user. Here, the application may be a program operated on the basis of a java virtual machine JVM in a broadcasting terminal, and is transmitted from the broadcasting system.

Here, application combined with data is defined as a data broadcasting application.

At present, the data broadcasting application is provided through an object carousel method in accordance with an MHP, an OCAP and an ACAP standardized in Europe and America. In this case, a middleware set in the broadcasting terminal receives an object carousel having application class and data and then operates the application in accordance with the object carousel.

The prior art broadcasting system, however, has a drawback in that it takes about dozen seconds to several minutes to download and/or load application and data and perform data parsing for the application service.

Hereinafter, the time to be taken for the application service, including the time for the downloading, loading and data parsing, will be referred to as a data broadcasting standby time.

In case that much time is required for viewing the data broadcasting (the channel) as mentioned above, users loses interest in viewing the channel and obtaining additional information through the application as well.

In the conventional technique, a given image is provided during a data broadcasting standby time. However, the given image, as an image of no concern to the application service, does not include information desired by the user, and so the data broadcasting does not stimulate interest of the user.

The above information disclosed in this Related Art section is only for enhancement of understanding of the background of the invention and therefore it may contain information that does not form the prior art that is already known in this country to a person of ordinary skill in the art.

SUMMARY OF DISCLOSURE

Accordingly, the present invention is provided to substantially obviate one or more problems due to limitations and disadvantages of the related art.

An example embodiment of the present invention provides a method and a system for providing application service which provide a preview contents related to an application to a user during a data broadcasting standby time.

Another example embodiment of the present invention provides a method and a system for providing application service which enables a user to regard that an application is executed during the data broadcasting standby time.

Still another example embodiment of the present invention provides a method and a system for providing application service which provide new preview contents corresponding to update in case that data is updated.

Still another example embodiment of the present invention provides a method and a system for providing application service which provide different preview contents in accordance with user information.

In one aspect, the present invention provides a method of providing application service in a digital data broadcasting system coupled to at least one broadcasting terminal through a network includes generating a preview contents by using first data combined with an application for data broadcasting service, wherein the preview contents has second data to be provided when a user requests the application service; and transmitting the generated preview contents to the broadcasting terminal. Here, the broadcasting terminal outputs preview contents during a data broadcasting standby time.

In another aspect, the present invention provides a method of providing a preview contents in a broadcasting terminal coupled to a digital data broadcasting system through a network includes receiving at least one preview contents related to data broadcasting application and meta data for defining attribute of the preview contents from the digital data broadcasting system, wherein the preview contents has data to be provided when a user requires application service; analyzing the meta data; and outputting selectively at least one of the preview contents during a data broadcasting standby time in accordance with the analyzed result.

In still another aspect, the present invention provides a method of providing a preview contents in a broadcasting terminal coupled to a digital data broadcasting system through a network includes receiving attribute information for generation of a preview contents related to application from the digital data broadcasting system; analyzing the attribute information; generating the preview contents by using first data combined with the application in accordance with the analyzed result, wherein the preview contents has second data to be provided when a user requests application service; and outputting the preview contents during a data broadcasting standby time.

In yet still another aspect, the present invention provides a digital data broadcasting system coupled to at least one broadcasting terminal through a network includes an application server configured to register and manage first data and application for data broadcasting service, and combine the first data with the application; and a preview contents generating server configured to generate a preview contents by using the first data combined with the application, wherein the preview contents has second data to be provided when a user requests application service. Here, the broadcasting terminal outputs the preview contents during a data broadcasting standby time.

In a further aspect, the present invention provides an apparatus for providing application service which provides a preview contents, outputted before application for data broadcasting service is executed, in a broadcasting terminal includes an attribute information analysis section configured to analyze attribute information of generation of a preview contents corresponding to the application; and a preview contents generating section configured to generate the preview contents by using data combined with the application through analysis of the attribute information. Here, the preview contents includes data to be provided when a user requires application service.

In a method and a system for providing application service of the present invention, a user may verify useful information during a data broadcasting standby time.

In addition, the method and a system may provide different preview contents, i.e. information in accordance with on user information during the data broadcasting standby time.

BRIEF DESCRIPTION OF DRAWINGS

Example embodiments of the present invention will become more apparent by describing in detail example embodiments of the present invention with reference to the accompanying drawings, in which.

DETAILED DESCRIPTION

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising, ", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
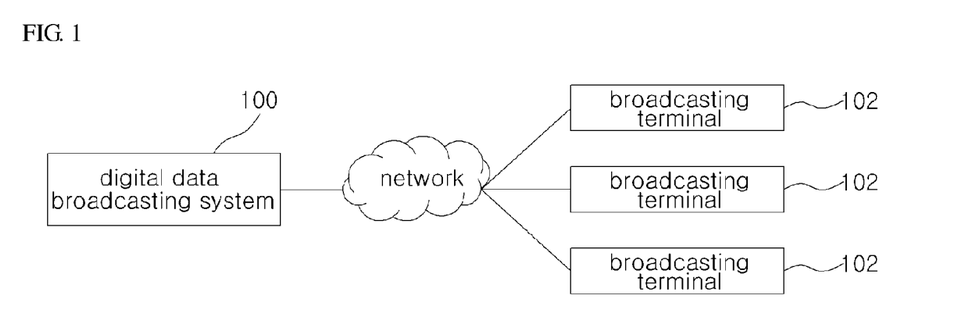
FIG. 1 is a block diagram illustrating a digital data broadcasting system according to one example embodiment of the present invention.

FIG. 1 is a block diagram illustrating a digital data broadcasting system according to one example embodiment of the present invention.

In FIG. 1, the digital data broadcasting system 100 is coupled to at least one broadcasting terminal 102 through a network. Here, the network includes a wire network having an Internet and an exclusive line, and a wireless network having wireless Internet, a mobile communication network and a satellite communication network, and a broadcasting network.

The digital data broadcasting system 100 converts a video signal and an audio signal for broadcasting program of various channels into a preset format, and then transmits the converted signal to the broadcasting terminal 102.

In addition, the digital data broadcasting system 100 performs a scheduling function concerning the broadcasting program and a scrambling function for preventing access of other people except a subscriber.

Furthermore, the digital data broadcasting system 100 may include extra communication server, e.g. return path server for the purpose of processing requirement of a user through an uplink channel, and then provide Internet service and various communication service using the communication server.

The digital data broadcasting system 100 may further provide data broadcasting application for use in various additional services and interactive service as well as the video signal/audio signal for a specific channel. Here, the data broadcasting application is formed by combining data received from news system, shopping system, stock system with application, and may be provided to the broadcasting terminal 102 in case that the user requires the service.

The broadcasting terminal 102 tunes the broadcasting signal provided from the digital data broadcasting system 100, and displays an image corresponding to the tuned broadcasting signal.

The broadcasting terminal 102 processes the broadcasting signal (video signal, audio signal and data signal) corresponding to a channel selected by the user of the tuned broadcasting signal, and then provides the processed broadcasting signal to the user.

An operating system for executing the application may be suitably set in the broadcasting terminal 102. Here, the operating system executes the application in case that the broadcasting signal has the data broadcasting application, and provides data combined with the application to the user.

The application outputs a menu image for request of a certain service by the user through a given display section, parses the data combined therewith in accordance with the request of the user, and outputs contents having the data such as text and graphic.

An application controller (not shown) set in the broadcasting terminal 102 controls loading of the application, etc. Here, much time is required for loading the application. In addition, in data broadcasting application service, much time is required for downloading the application and the data, and the parsing the data for the application service.

In one example embodiment of the present invention, the broadcasting terminal 102 provides a preview contents related to the data broadcasting application to the user during a data broadcasting standby time. Here, as discussed above, the data broadcasting standby time may include, for example, a time for download of the data, a time for loading of the application and a time for the data parsing.

In one example embodiment of the present invention, the preview contents is combination data provided to the user when the user requests the application service, and may include text, graphic, video clip, audio clip and advertisement data.

In one example embodiment of the present invention, since the preview contents should be rapidly executed in the broadcasting terminal 102, it is desirable that the preview contents has small size. Additionally, the preview contents may include a part of the video clip to be provided to the user when the application is executed.

This preview contents may be a contents image having data provided to the user when the application is executed. In case that the data are the video clip, the preview contents may have some frame of the video clip. For example, in the application for providing weather information, the preview contents provided to the user may be an image having at least one of whole country weather information, specific area weather information, weekly weather information and monthly weather information. Here, the information included in the image is information provided on the basis of present time when the application is executed.

In one example embodiment of the present invention, information (e.g. whole country weather information) which many users are interested in may be provided as the preview contents. However, the preview contents may be provided with a variety of information in accordance with user information without limit. For instance, in case that the data broadcasting concerning weather is on standby, the preview contents in accordance with the user information may include weather information of an area where the user is located (area where the broadcasting terminal 102 is located) or weather information of an area required previously by the user.

That is, the preview contents may be provided in accordance with the user information such as user basic information (age, sex, area) and selection information of the user about specific service (record information).

In one example embodiment of the present invention, attribute information for generation of the preview contents may be further defined. In case that the data broadcasting application is registered, the digital data broadcasting system 100 detects whether or not attribute information, for generation of the preview contents, for a corresponding application exists. In case that the attribute information exists, the digital data broadcasting system 100 analyzes the attribute information, and generates at least one preview contents in accordance with the analyzed result.

In one example embodiment of the present invention, the preview contents may be generated for each directory in accordance with kind of service, e.g. news, weather, stock, shopping, etc. For example, in case of stock application, the preview contents may be a contents image having data concerning main screen, invest information, market price information, overseas stock information. Here, the preview contents may be dynamically generated in the digital data broadcasting system 100 by reflecting in real time renewal of the data broadcasting application.

Generally, the data in the data broadcasting application may be renewed periodically or non-periodically, and thus the information provided to the user may be continuously changed. In case that the data broadcasting application is renewed, i.e. the data are renewed, the preview contents may be newly generated for each of preset directories.

The digital data broadcasting system 100 transmits the data broadcasting application and the preview contents to the broadcasting terminal 102. The broadcasting terminal 102 outputs the transmitted preview contents during the data broadcasting standby time.

In one example embodiment of the present invention, the digital data broadcasting system 100 may generate a preview contents set having a plurality of preview contents. In this case, the broadcasting terminal 102 receives the preview contents set from the digital data broadcasting system 100, and may display selectively at least one preview contents of the preview contents set.

In case that user set information is pre-stored, the broadcasting terminal 102 may output a preview contents corresponding the pre-stored set information of the preview contents set. However, in case that the user set information is not stored, the broadcasting terminal 102 may output a basic preview contents as default.

The preview contents provided to the user during the data broadcasting standby time include useful information, provided to the user in accordance with the request of the user when the application is executed, not meaningless information.

Since the preview contents may be dynamically generated in accordance with the renewal of the data, the user may verify recent renewed information before the application is executed.

Hereinafter, a process of generating the preview contents will be described in detail with reference to FIG. 2 to FIG. 4.

Figure 2:
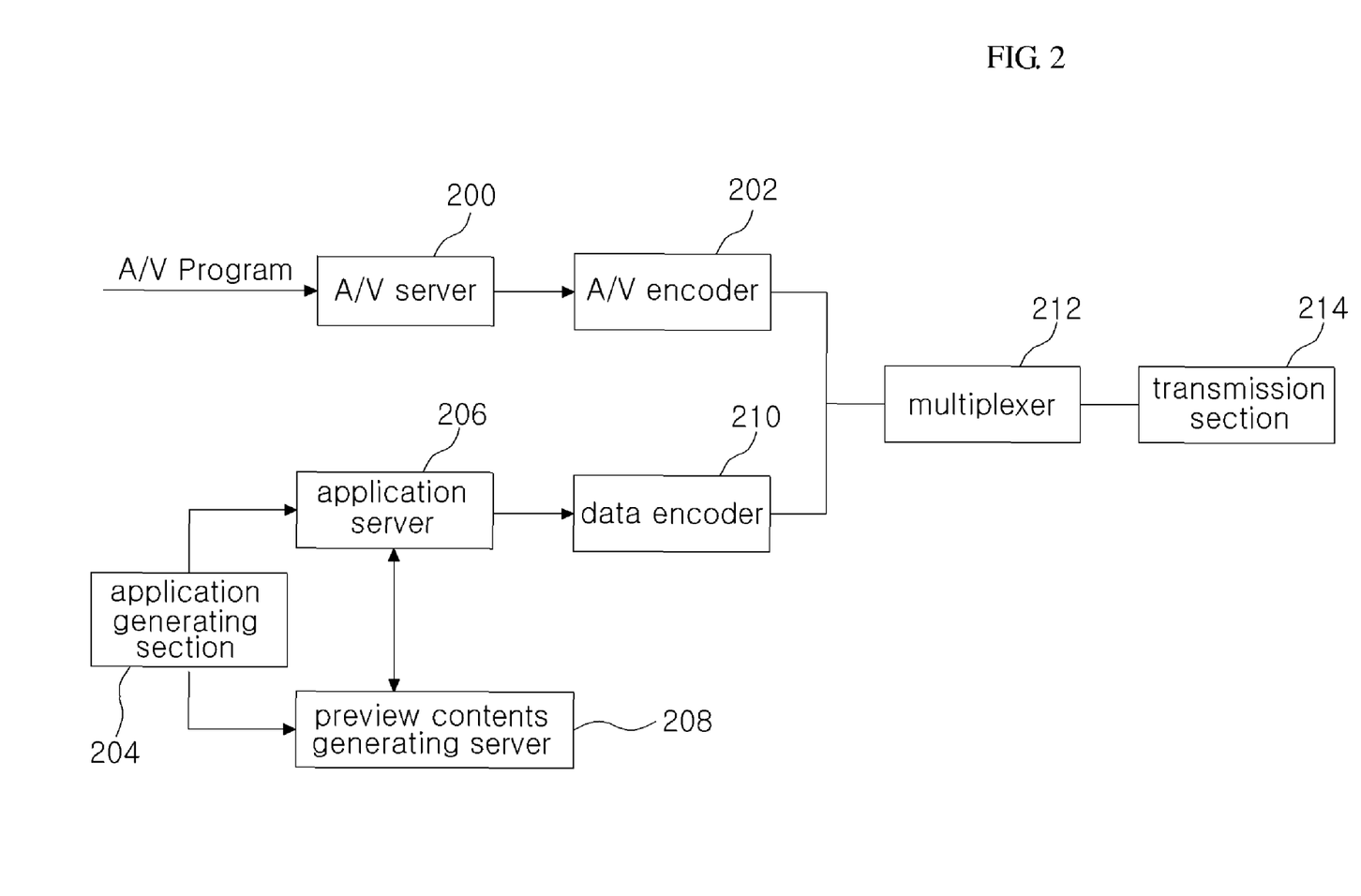
FIG. 2 is a block diagram illustrating a digital data broadcasting system according to one example embodiment of the present invention.

FIG. 2 is a block diagram illustrating a digital data broadcasting system according to one example embodiment of the present invention.

In FIG. 2, the digital data broadcasting system 100 includes an audio/video server 200 (Hereinafter, referred to as "A/V server"), an audio/video encoder 202 (hereinafter, referred to as "A/V encoder"), an application generating section 204, an application server 206, a preview contents generating server 208, a data encoder 210, a multiplexer 212 and a transmission section 214.

The A/V server 200 receives broadcasting programs having an audio signal and a video signal from an exterior program provider or a terrestrial broadcasting station, etc, and manages the received broadcasting programs.

The A/V server 200 outputs in real time the received audio signal and the video signal to the A/V encoder 202.

The A/V encoder 202 converts the audio signal and the video signal into predetermined format. In one example embodiment of the present invention, the A/V encoder 202 may convert the audio signal and the video signal into a moving picture experts group2-transport stream (MPEG2-TS) format in accordance with standard of the digital broadcasting.

The application generating section 204 generates the application on the basis of a multimedia home platform (MHP), and transmits the generated application to the application server 206.

The application generating section 204 may generate the data broadcasting application in accordance with standard or non-standard digital data broadcasting such as OCAP and ACAP.

Additionally, the application generating section 204 may define the attribute information for generation of a preview contents corresponding to a given application.

The application server 206 registers and manages the application and the attribute information transmitted from the application generating section 204.

The application server 206 receives in real time or periodically the data from a data server such as a meteorological office server, a stock server and a news server, etc., and combines the received data with the application, thereby generating the data broadcasting application. Here, the data may be provided through an MPEG-2 digital storage media command and control DSM-CC carousel. However, the data may be provided through various methods such as an IP multicast and an HTTP protocol.

The above combination process is not shown in the drawings, but may be performed by an extra carousel server.

In one example embodiment of the present invention, the digital data broadcasting system 100 may suitably further include a preview contents generating server 208.

Figure 3:
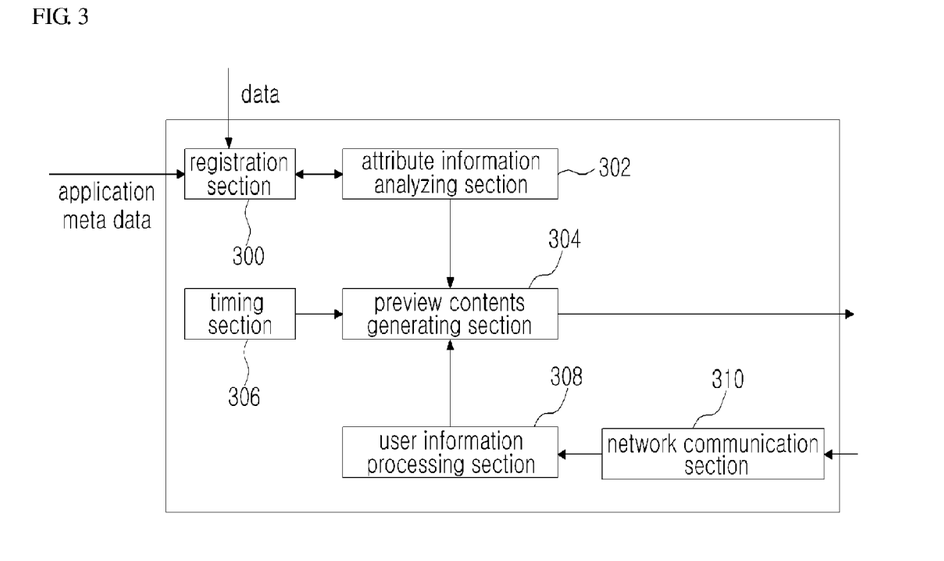
FIG. 3 is a block diagram illustrating a preview contents generating server according to one example embodiment of the present invention.

FIG. 3 is a block diagram illustrating a preview contents generating server according to one example embodiment of the present invention.

In FIG. 3, the preview contents generating server 208 of the present embodiment includes a registration section 300, an attribute information analyzing section 302, a preview contents generating section 304, a timing section 306, a user information processing section 308 and a network communication section 310.

The registration section 300 receives and registers the application, the attribute information for generation of the preview contents and the data from the application generating section 204 and the application server 206.

The attribute information analyzing section 302 analyzes the attribute information concerning the registered application in case that generation of the preview contents for the registered application is required.

The preview contents generating section 304 generates the preview contents having certain data by using the analyzed information.

In addition, the preview contents generating section 304 may further generate meta data, defining attribute of the generated preview contents, to output the preview contents in the broadcasting terminal 102.

In one example embodiment of the present invention, the preview contents generating section 304 may generate the preview contents set having a plurality of preview contents for one application so that the broadcasting terminal 102 may display selectively one of the preview contents.

The preview contents generating section 304 may suitably operate with the timing section 306, and generates periodically the preview contents set every preset time. In addition, the preview contents generating section 304 may generate one or more preview contents set in case that an event such as update of the data is occurred.

The preview contents set have the data, for each preset directory, that is to be provided to the user when the application is executed. The preview contents generating section 304 receives the data related to the application from the application server 206, and generates the preview contents set, i.e. plural preview contents based preset directory using the received data. Here, the directory may be variously set in accordance with kind of the service. In case of weather, the directory may be divided into whole country weather and specific area weather. In case of news, the directory may be divided into politic, economy, culture, sports, etc. Additionally, the directory may be set as depth menu screen provided in a certain data broadcasting service.

In one example embodiment of the present invention, the preview contents generating section 304 may generate the preview contents on the basis of user information.

As shown in FIG. 3, the preview contents generating server 208 receives user information from the broadcasting terminal 102 through the network communication section 310. The user processing section 308 processes the received user information, and then outputs the processed information to the preview contents generating section 304. Here, the user information means information concerning specific service selected by a user, and may include for example selection information of the user for each directory such as politic, economy, culture in case of news service, user's sex information, area information and age information, etc.

The preview contents generating section 304 may suitably generate only one preview contents, to be provided to a specific user, not the preview contents set by using the user information. In this case, transmission efficiency may be enhanced because the preview contents generating section 304 do not generate plural preview contents and the broadcasting terminal 102 receives only one preview contents.

It is described above that since the application server 206 generates the data broadcasting application, formed by combining the data with the application, the preview contents generating server 208 receives the data from the application server 206. However, the preview contents generating server 208 may, without being coupled to the application server 206, receive the application from the application generating section 204, and receive directly the data from the data server.

In one example embodiment of the present invention, the preview contents generating section 304 may generate the preview contents having further advertisement data.

In one example embodiment of the present invention, the attribute information may suitably include an advertisement inserting area therein as well as the information for generation of the preview contents. The preview contents generating section 304 may generate the preview contents in which a certain advertisement data is inserted in the advertisement inserting area. Here, a menu indication area, in which text is shown and exists as inactive state, may be defined as the advertisement inserting area so that the user recognizes that the application is being executed. The preview contents generating section 304 may suitably generate the preview contents in which the advertisement data is inserted into the menu indication area.

The inserted advertisement data may be provided with other useful data to the user before the application is executed. As a result, exposure efficiency of the advertisement may be enhanced.

Now referring to FIG. 2, the preview contents generated from the preview contents generating server 208 is outputted to the data encoder 210.

The data encoder 210 converts the data broadcasting application and the preview contents into predetermined format, and then outputs the converted file. However, the data encoder 210 may encode respectively the data broadcasting application and the preview contents into different formats. In other words, the data encoder 210 encodes the data broadcasting application and the data to one file, and encodes the preview contents and the meta data indicating attribute of the preview contents to another file.

In case that the encoded files are transmitted to the broadcasting terminal 102, the file concerning the preview contents and the meta data may be transmitted before the file concerning the data broadcasting application is transmitted. In this case, the digital data broadcasting system 100 may transmit in advance file relation information such as a video, an audio, data, etc to the broadcasting terminal 102. The broadcasting terminal 102 may firstly request download of the preview contents and the meta data to the digital data broadcasting system 100 through the transmitted file relation information.

Since the file concerning the preview contents and the meta data has small size, the digital data broadcasting system 100 may transmit rapidly the file concerning the preview contents and the meta data to the broadcasting terminal 102 compared to transmission of the file concerning the data broadcasting application.

The multiplexer 212 adds an output signal of the data encoder 210 and an output signal of the A/V encoder 202 to one signal to be broadcasted.

The transmission section 214 modulates the signal added by the multiplexer 212 depending on a broadcasting medium (terrestrial broadcasting, cable broadcasting, satellite broadcasting, etc), performs up-converting about the modulated signal, and then transmits the up-converted signal to the broadcasting terminal 102.

The broadcasting terminal 102 processes the transmitted signal, and outputs the processed signal.

Figure 4:
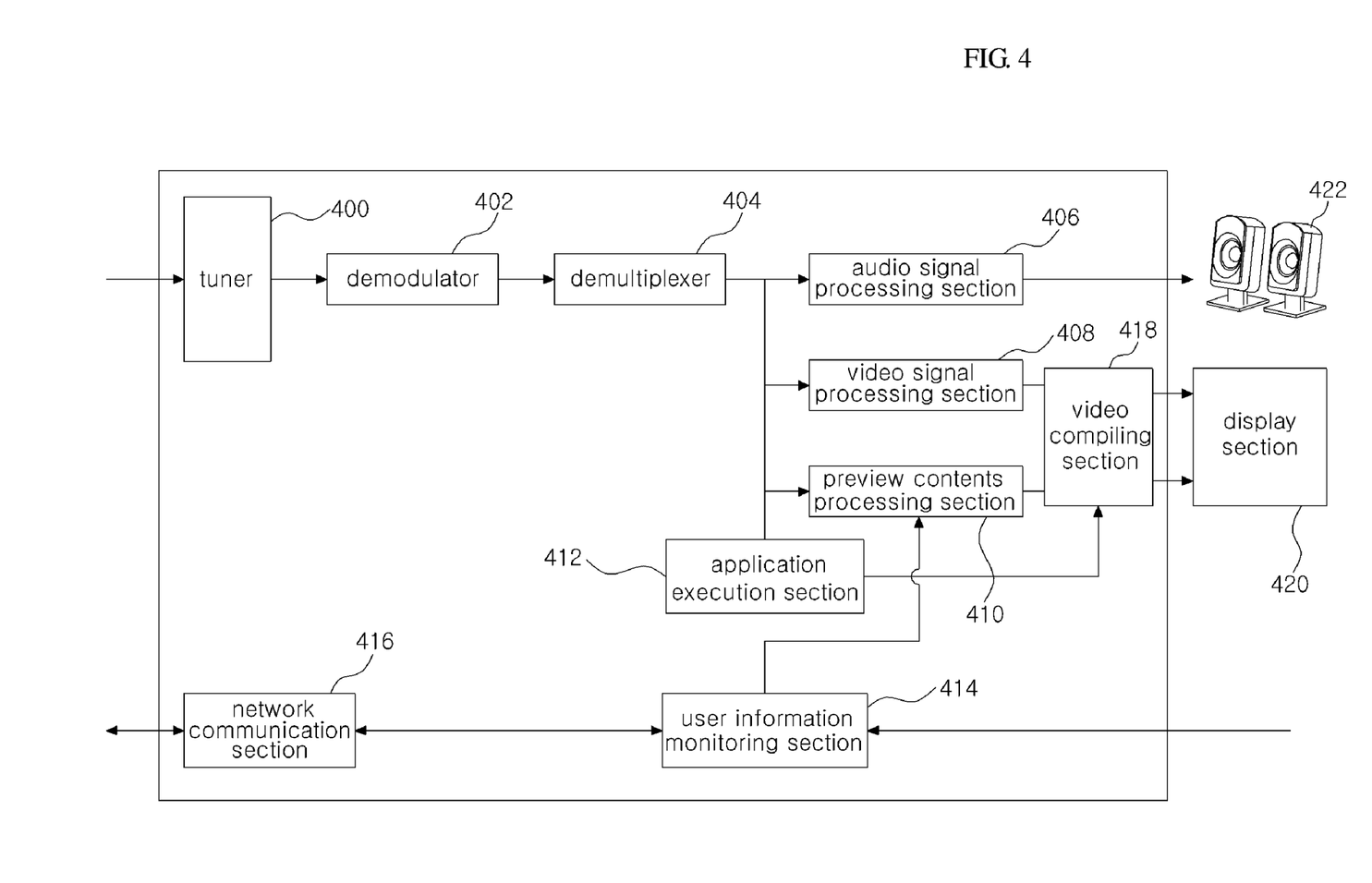
FIG. 4 is a block diagram illustrating a broadcasting terminal according to one example embodiment of the present invention.

FIG. 4 is a block diagram illustrating a broadcasting terminal according to one example embodiment of the present invention.

The broadcasting terminal 102 may be a set-top box coupled to a common TV so as to provide data broadcasting service.

In FIG. 4, the broadcasting terminal 102 may include a tuner 400, a demodulator 402, a demultiplexer 404, an audio signal processing section 406, a video signal processing section 408, a preview contents processing section 410, an application execution section 412, a user information monitoring section 414, a network communication section 416 and a video compiling section 418.

The tuner 400 outputs selectively the broadcasting signal of at least one channel of the received broadcasting signals with synchronization with a certain frequency.

The demodulator 402 demodulates the broadcasting signal outputted from the tuner 400.

The demodulated signal is a signal having an audio signal, a video signal and data signal.

The demultiplexer 404 extracts the audio signal, the video signal and the data signal from the demodulated signal, and outputs the extracted signals.

The audio signal outputted from the demultiplexer 404 is processed by the audio signal processing section 406 having an audio decoder, an audio digital analog converter DAC, and then the processed audio signal is outputted through the speaker 422.

The video signal processing section 408 has a video decoder, a video memory and a video DAC, and decodes the video signal.

The decoded video signal is converted into an analog signal, and then the converted video signal is outputted to the display section 420 through the video compiling section 418.

The signal outputted from the demultiplexer 404 may have a preview contents signal and the meta data. In this case, the preview contents processing section 410 outputs the preview contents to the display section 420 through analysis of the meta data.

The broadcasting terminal 102 may receive the preview contents set having plural preview contents. The preview contents processing section 410 outputs selectively one preview contents of the preview contents set through the user information stored in the user information monitoring section 414. Here, the user information may have service use record information of the user concerning specific application, establishment area information of the broadcasting terminal 102, age information of the user, sex information of the user, etc.

The preview contents processing section 410 may output a preset basic preview contents through analysis of the meta data corresponding to the preview contents in case that the user information related to the preview contents does not exist, and then output the preview contents considering the user information in case that the user information is recorded.

In another example embodiment of the present invention, the digital data broadcasting system 100 may transmit the preview contents not having the advertisement data to the broadcasting terminal 102. Here, the advertisement data may be inserted in the preview contents by the preview contents processing section 410.

The meta data for the preview contents may have information concerning the advertisement inserting area. The preview contents processing section 410 outputs the preview contents, having the data to be provided to the user when the application is executed and the advertisement data inserted in the advertisement inserting area, through the display section 420 in accordance with analysis of the meta data.

It is described above that the advertisement inserting area may be an inactivate menu indication area. However, the advertisement inserting area is not limited to the inactivate menu indication area, and may include every area except an indication area of the data to be provided to the user.

The preview contents processing section 410 detects the advertisement inserting area in case that the preview contents is received, inserts a certain advertisement data into the advertisement inserting area, and then outputs the preview contents in which the advertisement data is inserted.

The above process of inserting the advertisement data may be performed by a middleware set in the broadcasting terminal 102 or an EPG (Electronic Program Guide) application loaded in a memory when the broadcasting terminal 102 is driven.

That is, the EPG application determines whether or not the preview contents corresponding to the application service is provided. In case that the preview contents exist, the EPG application requests firstly download of the preview contents and the meta data. In addition, the EPG application may control a process such as outputting process of the preview contents and inserting process of the advertisement data.

The user information monitoring section 414 stores basic information such as sex and age inputted by the user and selection information of the user (record information of the user) for specific application service.

The user information may be transmitted to the digital data broadcasting system 100 through the network communication section 416.

The user information may be transmitted to the preview contents generating server 208. In this case, the preview contents generating server 208 may generate individual preview contents not the preview contents set in accordance with the user information.

In one example embodiment of the present invention, the preview contents may be outputted during the data broadcasting standby time.

The application execution section 412 may be an application controller such as an xlet controller (java application program received to the broadcasting terminal 102), generate the preview contents having the data through execution of the application, and output the menu image for service request of the user to the display section 420 through the video compiling section 418.

Generally, a main menu image set as default is outputted as the menu image in accordance with the execution of the application. However, the application execution section 412 may output the menu image for service use on the basis of the preview contents outputted in advance.

Figure 7:
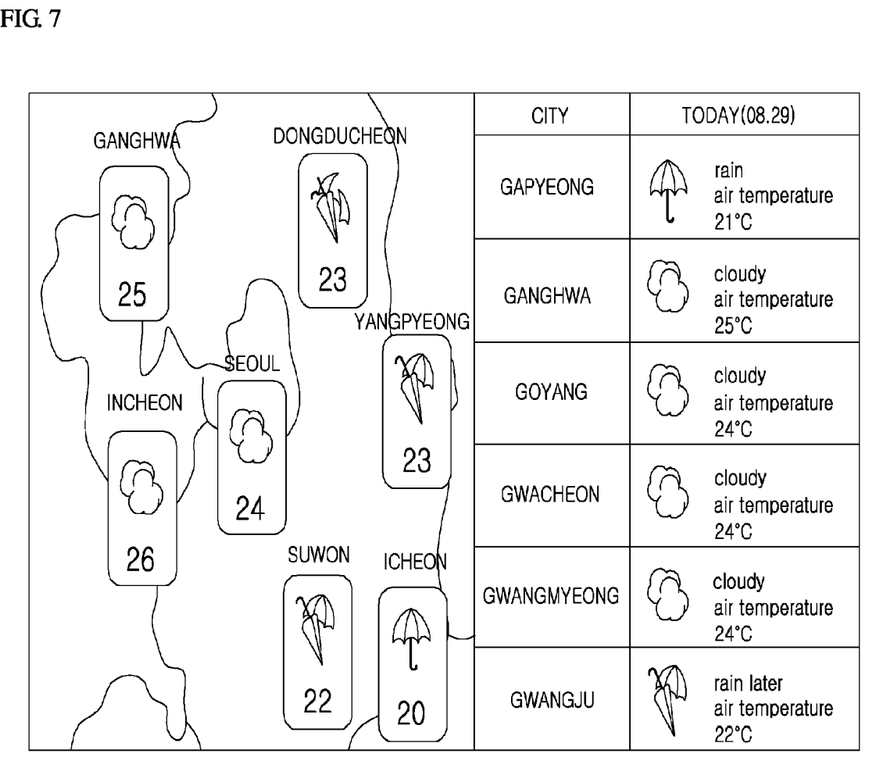
FIG. 7 is a view illustrating exemplary screen of a preview contents according to one example embodiment of the present invention.
Figure 8:
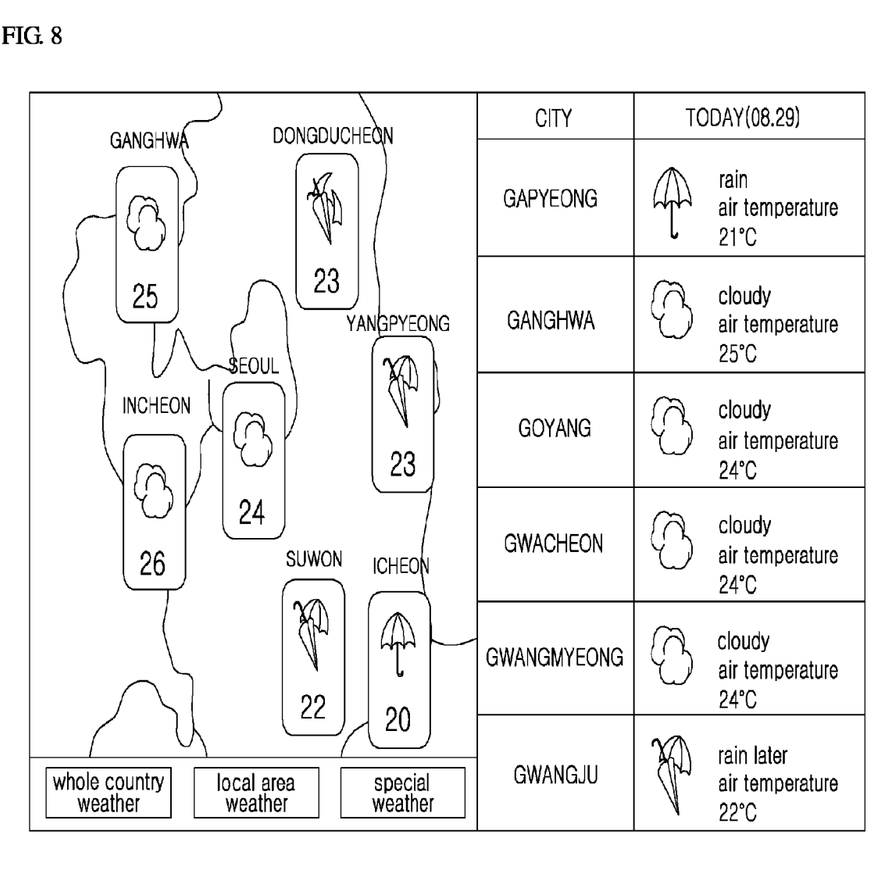
FIG. 8 is a view illustrating exemplary screen outputted when application is executed according to one example embodiment of the present invention.

For example, in case that the application is executed under the condition that the preview contents is displayed on the display section 420 during the data broadcasting standby time as shown in FIG. 7, the application execution section 412 detects the present preview contents, and outputs the menu image having new menu indication area 800 and the same data as in the preview contents in accordance with the detection result as shown in FIG. 8.

Figure 9:
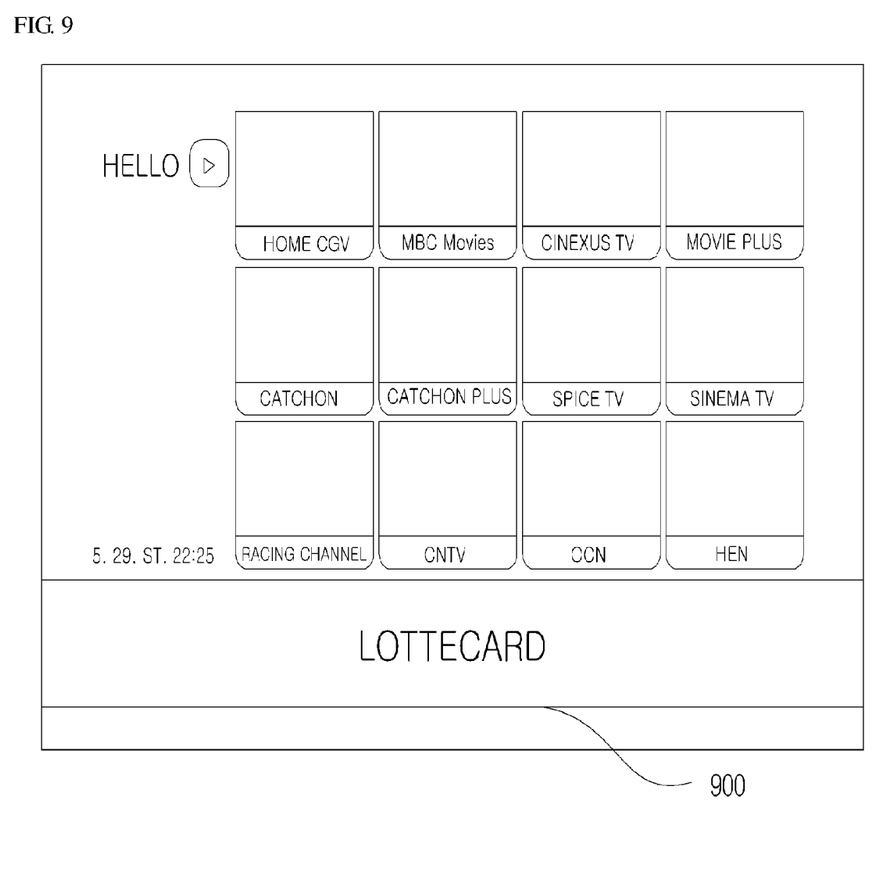
FIG. 9 is a view illustrating a process of inserting advertisement data in a preview contents.

As shown in FIG. 9, the preview contents having the data and the inactivate menu indication area (in which the advertisement data 900 is inserted) may suitably be outputted before the application is executed. The application execution section 412 may output the menu image having the same data and the menu indication area in which the advertisement data is shifted in original location after the data broadcasting standby time is finished.

Accordingly, the user may obtain the information desired by the user through the preview contents before the application is executed. In addition, since the desired information is in advance outputted when the user selects the application service, the user may feel that the application is being executed at present.

In another example embodiment of the present invention, the preview contents may be generated in the broadcasting terminal 102.

The digital data broadcasting system 100 may transmit the data broadcasting application and the meta data for generation of the preview contents to the broadcasting terminal 102. The broadcasting terminal 102 may generate one or more preview contents through analysis of the meta data. In this case, the preview contents may be generated in accordance with pre-stored user information.

Hereinafter, a process of generating the preview contents will be described in detail with reference to FIG. 5 and FIG. 6.

Figure 5:
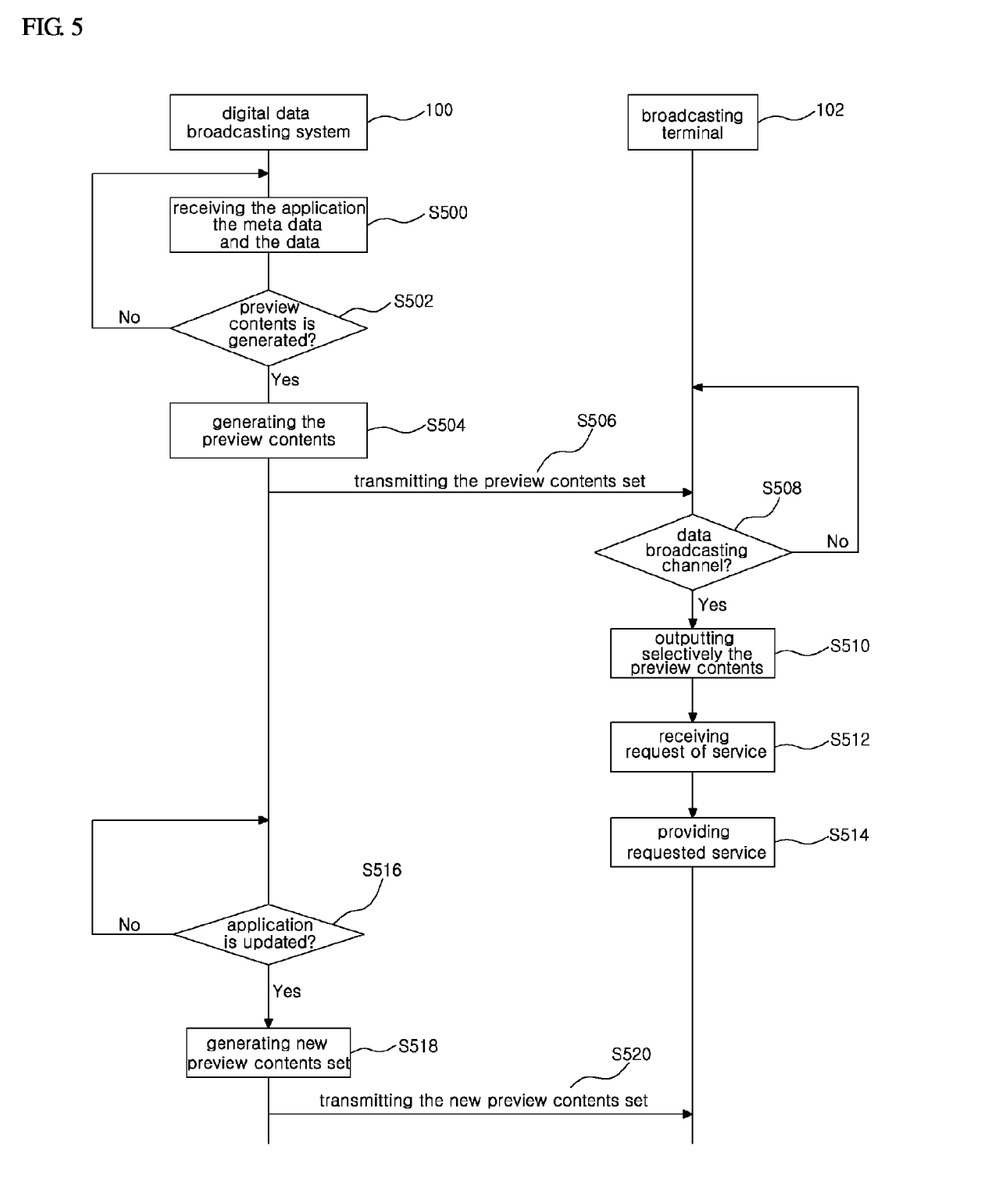
FIG. 5 is a flowchart illustrating a process of generating the preview contents according to one example embodiment of the present invention.

FIG. 5 is a flowchart illustrating a process of generating the preview contents according to one example embodiment of the present invention.

In FIG. 5, in step of S500, the preview contents generating server 208 receives the application, the meta data and the data from the application generating section 204, the application server 206 or the data server (not shown).

In step of S502, the preview contents generating server 208 determines whether or not generation of the preview contents concerning a corresponding application is needed.

In step of S504, in case that it is determined that the generation of the preview contents is needed, the preview contents generating server 208 generates the preview contents through analyzed attribute information (meta data).

A plurality of the preview contents may be generated in accordance with preset directories for given service.

In step of S506, the preview contents generating server 208 transmits the preview contents set to the broadcasting terminal 102. In this case, the meta data for the preview contents set may be transmitted with the preview contents set to the broadcasting terminal 102.

The step S506 may be performed before the application and the data are downloaded.

In step of S508, in case that the user selects a certain channel, the broadcasting terminal 102 determines whether or not the channel is a data broadcasting channel having the application.

In step S510, in case that the channel is the data broadcasting channel, the broadcasting terminal 102 outputs selectively at least one preview contents of the transmitted preview contents set during one or more of a time for the download of the application and the data, a time for loading of the application and a data parsing time for the application service.

In case that the user requests specific service after the application is executed in step of S512, the broadcasting terminal 102 provides the requested service in step of S514. Here, the contents corresponding to the directory selected by the user is provided as the requested service.

In step of S516, the preview contents generating server 208 determines whether or not the data broadcasting application is updated. In an embodiment, in step of S516, whether or not the data combined with the application in the data broadcasting application is updated may be determined.

In step of S518, the preview contents generating server 208 generates new preview contents corresponding to renewed contents.

In step of S520, the preview contents generating server 208 transmits the new preview contents to the broadcasting terminal 102.

Figure 6:
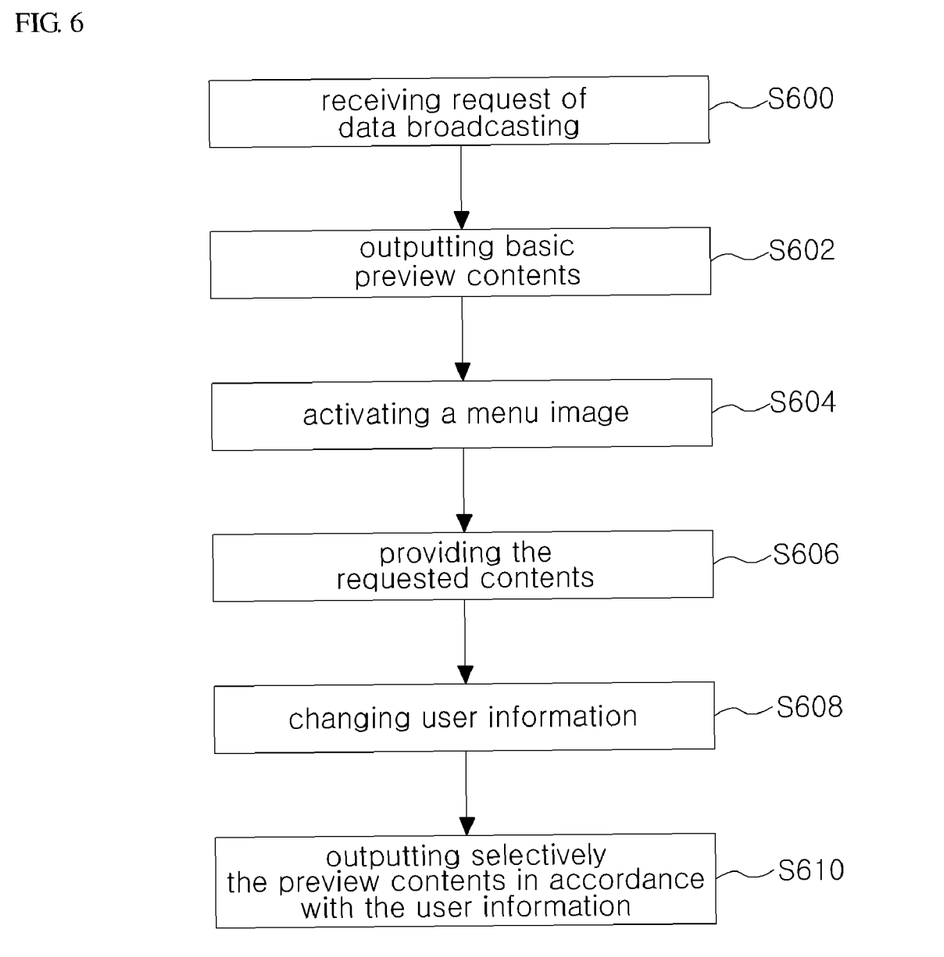
FIG. 6 is a flowchart illustrating a process of providing application service in the broadcasting terminal according to one example embodiment of the present invention.

FIG. 6 is a flowchart illustrating a process of providing application service in the broadcasting terminal according to one example embodiment of the present invention.

In FIG. 6, in case that the data broadcasting is requested in step S600, the broadcasting terminal 102 outputs the basic preview contents of the preview contents set received through the step S506 before the application is executed in step of S602. This may be performed through analysis of the meta data indicating attribute of the preview contents.

In step of S604, in case that the application is executed, the broadcasting terminal 102 activates the menu image on the basis of the preview contents.

In step of S606, the broadcasting terminal 102 outputs the requested preview contents through the menu image.

In step of S608, information concerning service request of the user is collected by the user information monitoring section 514, and thus the user information is changed.

In step of S610, in case that the user requests the same data broadcasting later, the broadcasting terminal 102 outputs selectively at least one preview contents of preview contents set in accordance with the changed user information.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A method of providing an application service in a digital data broadcasting system coupled to at least one broadcasting terminal through a network, the method comprising:
    tuning a broadcasting signal provided from the digital data broadcasting system;
    processing the broadcasting signal including at least one of a video signal, an audio signal, and a data signal corresponding to a channel selected by a user of the tuned broadcasting signal;
    generating preview contents by using first data combined with an application for data broadcasting service, wherein the preview contents have second data to be provided when the user requests the application service; and
    transmitting the generated preview contents to the broadcasting terminal, wherein the broadcasting terminal outputs the preview contents during a data broadcasting standby time,
    wherein an Electronic Program Guide (EPG) application set in the broadcasting terminal firstly requests download of the preview contents corresponding to the application and meta data corresponding to the preview contents, and then outputs the preview contents during the data broadcasting standby time,
    the preview contents include information concerning a preset advertisement inserting area which is an inactive menu indication area, and
    the broadcasting terminal generates the preview contents in which advertisement data is inserted in the inactive menu indication area.

2. The method of claim 1, further comprising:
    determining whether or not attribute information, for generation of the preview contents, corresponding to the application exists; and
    analyzing the attribute information in case that the attribute information exists.

3. The method of claim 1, wherein a plurality of preview contents in accordance with preset directories are generated, and the broadcasting terminal outputs selectively at least one of the preview contents.

4. The method of claim 3, wherein the broadcasting terminal outputs selectively at least one of the preview contents by using user information.

5. The method of claim 4, wherein the user information includes one or more of sex information of the user, age information, area information, and record information indicating previous use record of the application service.

6. The method of claim 1, further comprising:
    determining whether or not the first data is updated,
    wherein the step of generating the preview contents includes generating new preview contents renewed in accordance with updated first data in case that the first data is updated.

7. The method of claim 1, wherein the step of transmitting the preview contents includes transmitting the preview contents and meta data for defining attribute of the preview contents, and the broadcasting terminal analyzes the meta data and outputs the preview contents in accordance with the analyzed result.

8. The method of claim 1, wherein the broadcasting terminal outputs the preview contents during one or more of a time for download of the application and the data, a time for loading of the application and a data parsing time of the application service.

9. The method of claim 1, wherein the broadcasting terminal inserts a predetermined advertisement data into the inactive menu indication area, and outputs the inserted inactive menu indication area.

10. The method of claim 1, further comprising:
    receiving user information from the broadcasting terminal,
    wherein the step of generating the preview contents includes generating the preview contents by using the received user information.

* * * * *